US012250293B2

(12) United States Patent
Drucker et al.

(10) Patent No.: US 12,250,293 B2
(45) Date of Patent: Mar. 11, 2025

(54) EXECUTION OF HOMOMORPHICALLY ENCRYPTED CODE USING DYNAMICALLY SELECTED BLOCKS

(71) Applicant: International Business Machines Corporation, Armonk, NY (US)

(72) Inventors: Nir Drucker, Zichron Yaakov (IL); Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 17/936,113

(22) Filed: Sep. 28, 2022

(65) Prior Publication Data

US 2024/0106626 A1    Mar. 28, 2024

(51) Int. Cl.
| *G09C 1/00* | (2006.01) |
| *H04L 9/00* | (2022.01) |
| *H04L 9/06* | (2006.01) |
| *H04L 9/30* | (2006.01) |

(52) U.S. Cl.
CPC ............ *H04L 9/008* (2013.01); *H04L 9/0618* (2013.01)

(58) Field of Classification Search
None
See application file for complete search history.

(56) References Cited

U.S. PATENT DOCUMENTS

| 12,143,465 | B2* | 11/2024 | Nandakumar | ........ G06F 21/602 |
| 2003/0208660 | A1* | 11/2003 | van de Waerdt | ... G06F 12/0862 |
| | | | | 711/170 |
| 2015/0082425 | A1* | 3/2015 | Johnson | .................. G06F 21/54 |
| | | | | 726/22 |
| 2016/0026230 | A1* | 1/2016 | Overbeck | ............ G06F 1/3228 |
| | | | | 713/320 |
| 2017/0372226 | A1* | 12/2017 | Costa | ..................... G06N 20/00 |
| 2020/0310761 | A1* | 10/2020 | Rossi | ..................... H03M 7/18 |
| 2021/0092137 | A1 | 3/2021 | Sarpatwar et al. | |
| 2021/0119766 | A1 | 4/2021 | Suresh et al. | |
| 2021/0192076 | A1* | 6/2021 | Patel | ..................... G06F 21/602 |
| 2022/0114285 | A1 | 4/2022 | Biernacki et al. | |
| 2022/0206958 | A1* | 6/2022 | LeMay | ............... G06F 12/0831 |
| 2023/0109846 | A1* | 4/2023 | Covaci | ................... H03M 7/40 |
| | | | | 712/221 |
| 2024/0062102 | A1* | 2/2024 | Lal | ......................... H04L 9/008 |

OTHER PUBLICATIONS

Lloret-Talavera et al., "Enabling Homomorphically Encrypted Inference for Large DNN Models", Cryptography and Security; Machine Learning; Performance; arXiv:2103.16139; Mar. 30, 2021, 12 pages.
Sam Kumar et al., "MAGE: Nearly Zero-Cost Virtual Memory for Secure Computation", 15th USENIX Symposium on Operating Systems Design and Implementation, ISBN: 978-1-939133-22-9, Jul. 14, 2021, pp. 365-385.

* cited by examiner

*Primary Examiner* — Christopher B Robinson
(74) *Attorney, Agent, or Firm* — Aaron N. Pontikos

(57) ABSTRACT

An example system includes a processor to partition an arithmetic circuit representing a homomorphically encrypted (HE) code into a number of execution blocks. The processor can generate, for each of the number of execution blocks, manifests describing access patterns for a number of different machine environments. The processor can then dynamically execute the HE code by selecting successive blocks to execute based on an access pattern calculated for the execution block corresponding to a detected current machine environment.

20 Claims, 5 Drawing Sheets

EXECUTION OF HOMOMORPHICALLY ENCRYPTED CODE USING DYNAMICALLY SELECTED BLOCKS

BACKGROUND

The present techniques relate to homomorphically encrypted code. More specifically, the techniques relate to the execution of homomorphically encrypted code.

SUMMARY

According to an embodiment described herein, a system can include processor to partition an arithmetic circuit representing a homomorphically encrypted (HE) code into a number of blocks. The processor can also further generate, for each of the number of blocks, a number of manifests describing access patterns for a number of different machine environments. The processor can also dynamically execute the HE code by selecting a successive block to execute based on an access pattern calculated for the block corresponding to a detected current machine environment.

According to another embodiment described herein, a method can include partitioning, via a processor, an arithmetic circuit representing homomorphically encrypted (HE) code into blocks. The method can further include generating, via the processor, manifests describing access patterns for each of the blocks for a number of different machine environments. The method can also further include dynamically executing, via the processor, the HE code by selecting successive blocks to execute based on an access pattern calculated for the block corresponding to a detected current machine environment.

According to another embodiment described herein, a computer program product for execution of homomorphically encrypted code can include computer-readable storage medium having program code embodied therewith. The program code executable by a processor to cause the processor to partition an arithmetic circuit representing homomorphically encrypted (HE) code into blocks. The program code can also cause the processor to generate manifests describing access patterns for each of the blocks for a number of different machine environments. The program code can also cause the processor to dynamically execute the HE code by selecting successive blocks to execute based on an access pattern calculated for the block corresponding to a detected current machine environment.

DETAILED DESCRIPTION

Homomorphic encryption (HE) may be used to multiply and add two or more ciphertexts together without decrypting the ciphertexts first. However, HE may be very intensive in its use of random access memory (RAM). Some solutions use disk caching and prefetching according to access patterns as recoded in one execution. For example, different levels of caching may be used to prefetch and access code as needed. However, such access patterns may change as resources change during execution and thus may be different than an access pattern used offline. For example, resources may change access patterns due to different RAM size, where objects may be cached and perfected in different times. In addition, access patterns may change due to different numbers of central processing units (CPUs) being used. For example, more gates or operations may be executed concurrently, and thus more inputs may need to be ready in memory. Resources themselves may also change. For example, platforms may be changed during execution. In some examples, other processes may run in parallel to the executed HE process. Moreover, in distributed systems, different servers may have different resources.

According to embodiments of the present disclosure, a system includes a processor that can recursively partition an arithmetic circuit representing a homomorphically encrypted (HE) code into a number of blocks at a number of partitioning hierarchies. The processor can generate, for each of the number of blocks, a number of manifests describing access patterns for a number of different machine environments. The processor can then dynamically execute the HE code by selecting a successive block to execute based on an access pattern calculated for the block corresponding to a detected current machine environment. Thus, embodiments of the present disclosure allow dynamic execution of HE code that enables efficient use of resources, such as RAM footprint and different types and numbers of currently available systems for processing the HE code.

Figure 1A:
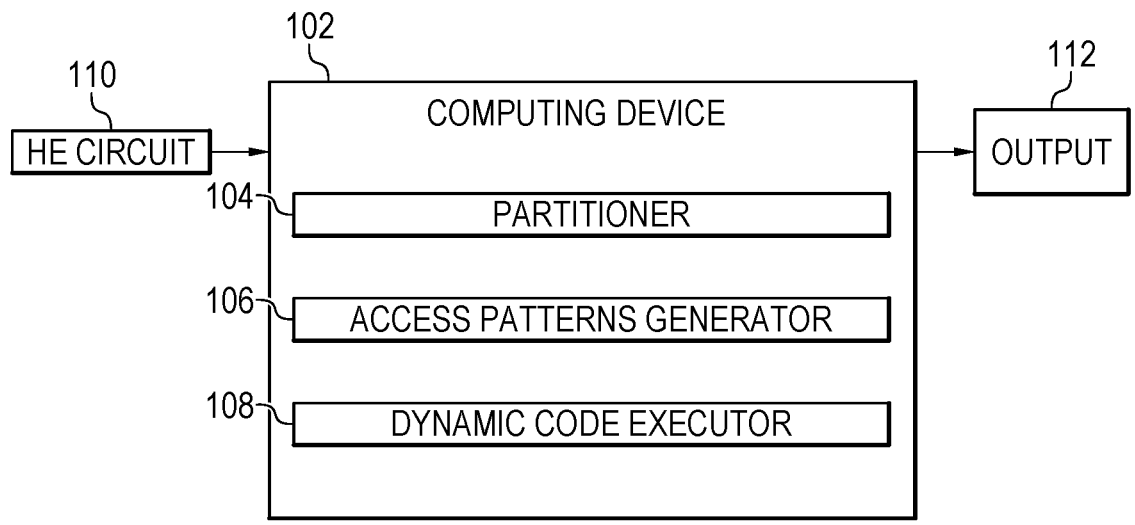
FIG. 1A is a block diagram of an example system for executing homomorphically encrypted (HE) code using dynamically selected blocks.

With reference now to FIG. 1A, a block diagram shows an example system for executing homomorphically encrypted (HE) code using dynamically selected blocks. The example system 100A of FIG. 1A includes a computing device 102. The computing device 102 includes a partitioner 104, an access patterns generator 106, and a dynamic code executor 108. The computing device 102 is shown receiving a homomorphically encrypted (HE) circuit 110 and outputting an output 112. For example, the HE circuit 110 may be fully homomorphically encrypted (FHE) code represented as an arithmetic circuit. For example, the arithmetic circuit may be a computation graph. In particular, because HE code is oblivious to input, the operations that a machine performs as the HE code is executed can be recorded to build a computation graph, referred to herein as an HE circuit.

In the example of FIG. 1A, the partitioner module 104 and the access patterns generator module 106 can generally process and analyze the HE circuit 110 in an offline mode that precedes an online mode to generate additional representations of the HE circuit 110. The dynamic code executor 108 can then generally dynamically execute HE code corresponding to the HE circuit based on currently available resources using the additional representations generated by the access patterns generator 106. For example, the dynamic code executor 108 can use the above representation to generate and run code optimized to current environment, changing the HE code dynamically as the machine environment changes.

In various examples, the partitioner 104 can partition the HE circuit 110 into additional representations of the HE circuit 110 composed of several blocks. For example, every HE circuit realizes a polynomial. In addition, some HE schemes like the Cheon-Kim-Kim-Song (CKKS) scheme, first released in 2016, support rotations which is not a polynomial operation. However, a polynomial may have many different circuits that realize the polynomial. As one example, the circuit built from the expression "$y*y+2*y*x+x*x$" and the circuit built from the expression "$(x+y)*(x+y)$" may have the same polynomial, but the first circuit involves three multiplication gates, one scalar multiplication gate, and two addition gates. Whereas the latter circuit involves one addition gate and one multiplication gate. In some examples, given a circuit C, the partitioner 104 can modify the circuit C to a different circuit C' that realizes the same polynomial but uses less memory. For example, a general circuit C, given as a directed acyclic graph (DAG), may use an amount of memory proportional to the number of gates, while the circuit C' in the form of a computation tree may use an amount of memory that is only logarithmic in the number of gates. However, an open problem in computer science is whether every circuit C can be modified to a circuit C' that requires logarithmic amount of memory. In computational complexity theory, this question is known as "L=?=P". Therefore, the partitioner 104 may use several heuristics to modify the circuit 110. In some examples, these heuristics may start by partitioning the circuit to several sub-circuits, referred to herein as blocks. Then, an equivalent computation tree is identified for a number of blocks and these computation trees marked as additional blocks at a higher level of a hierarchy. Finally, a final circuit is constructed from the generated blocks. This final circuit can be executed in steps, where in each step a system computes only one block. Thus, the final circuit may only use a logarithmic space and thus use a logarithmic amount of pick memory consumed during the circuit execution.

In some examples, the partitioner 104 may use different heuristics to partition a circuit into blocks, where each block is a computation tree. In one example heuristic, the partitioner 104 can find a computation tree embedded in the circuit, remove this computation tree from the circuit, and then continue to find another computation tree until all the gates in the circuit have been removed. To find a single computation tree, the partitioner 104 may start from a single node chosen arbitrarily, which may be regarded as a computation tree of size 1. The partitioner 104 can then add nodes to this computation tree while keeping the invariants that only the root of the computation tree may have an outgoing edge to a node that is not in the computation tree and only a leaf can have an incoming edge from outside the computation tree.

In some examples, the partitioner 104 can alternatively use another example heuristic that considers the polynomial realized by the circuit and uses algebraic methods to express the polynomial as arithmetic operations on simple sub-polynomials that can be realized by a computation tree. For example, each sub-polynomial may then become a block and the circuit can be replaced with a circuit of blocks.

In various examples, the partitioner 104 can generate a hierarchical circuit representation. For example, the partitioner 104 can recursively partition the arithmetic circuit representing the HE code into any number of blocks at any number of partitioning hierarchies. In particular, the partitioner 104 can first modify the HE circuit by duplicating blocks. For example, if there are outgoing edges only to Block B and Block C from Block A, then the partitioner 104 can duplicate Block A to create an identical Block A'. Then, the partitioner 104 can merge Block A' into Block B, and merge Block A into Block C. This duplication and merging removes the need to keep in memory the ciphertexts represented by the outgoing edges of Block A on the expense of increasing the number of gates in the circuit. The partitioner 104 can then create a hierarchical representation of the circuit. For example, at the bottommost level, the partitioner 104 can keep the block representation as were found in the previous representation. The partitioner 104 can create the next level in the hierarchical representation by duplicating and merging blocks. At the topmost level in the hierarchical representation, there may be only one block.

In some examples, the partitioner 104 can recursively partition each block into a variety of partitioning hierarchies. In various examples, the partitioner 104 can partition the HE circuit 110 into various representations corresponding to various partitioning hierarchies any number of suitable ways. For example, the partitioner 104 can partition according to functionality, serialization of the circuits, fan-in or fan-out parameters, arithmetic computation of the evaluated polynomial, or any combination thereof, among other suitable partitioning techniques. In some examples, the partitioner 104 can use block overlapping when partitioning. For example, a portion of one block may overlap with a portion of a different generated block, both at the same hierarchy as well as different hierarchies. An example partitioned HE circuit 110 is described in greater detail with respect to circuit 200 of FIG. 2.

Still referring to FIG. 1A, the access patterns generator module 106 can then generate access patterns for each block of the generated blocks. For example, the access patterns generator module 106 can generate different manifests describing each of the access patterns for different machine environments per block. Thus, in some examples, a total number of access patterns calculated and thus manifests generated for a given HE circuit 110 may be the number of total number of machine environments multiplied by the number of total generated blocks in the partitioned HE circuit 110.

In various examples, during execution, the dynamic code executor 108 can then dynamically select blocks to execute based on an access pattern calculated for the block corresponding to a detected current machine environment. For example, the detected current environment may include a detected amount of available memory or a detected number of available systems. As one example, using the hierarchical representation, the dynamic code executor 108 can change the RAM requirement and the CPU requirement of the circuit, one on the expense of the other. For example, depending on the number of CPUs and amount of RAM a particular server has, the dynamic code executor 108 can choose the hierarchy level to execute. During execution, resources may change dynamically. For example, if a server currently executing blocks starts or stops executing another circuit in parallel, then less or more resources may be available for executing an HE circuit. In this case, the dynamic code executor 108 can replace the blocks that have not been computed yet using their representation in a different level. For example, in response to detecting a change in a resource of the environment, the dynamic code executor 108 can finish an execution of a smallest block and re-evaluate a remaining number of internal blocks at a same level of a partition and subsequently evaluate external blocks at higher levels. In some examples, the dynamic code executor 108 can then select a successive block based on a largest block size for the detected current machine environment. In some examples, the dynamic code executor 108 can select the successive block based on a number of systems available to execute the HE code. In some examples, the dynamic code executor 108 can include a scheduler that may be a service that monitors a state of a system executing the HE code. For example, the state of a system may include the CPU usage, memory usage, etc. In some examples, the scheduler may alternatively be a stand-alone process per HE circuit 110. For example, as a stand-alone process, the scheduler may not perform the execution by itself, but only provide the instructions on how to execute blocks depending on environment parameters. In various examples, the scheduler can select subsequent blocks to execute based on a number of detected available systems. In some examples, the scheduler can select subsequent blocks to execute based on a largest block possible per system executing the blocks. For example, the largest block possible may be based on factors such as estimated latency, estimated memory, or estimated bandwidth available, among other possible factors. In some examples, the scheduler acting as a service may select blocks and sizes of blocks according to a stability of an executing system. For example, the scheduler may select larger block sizes for more stabilized systems.

It is to be understood that the block diagram of FIG. 1A is not intended to indicate that the system 100A is to include all of the components shown in FIG. 1A. Rather, the system 100A can include fewer or additional components not illustrated in FIG. 1A (e.g., additional computing devices, or additional HE circuits, outputs, etc.). For example, a circuit extractor (not shown) can extract the arithmetic circuit from the provided HE code using any suitable extraction technique.

Figure 1B:
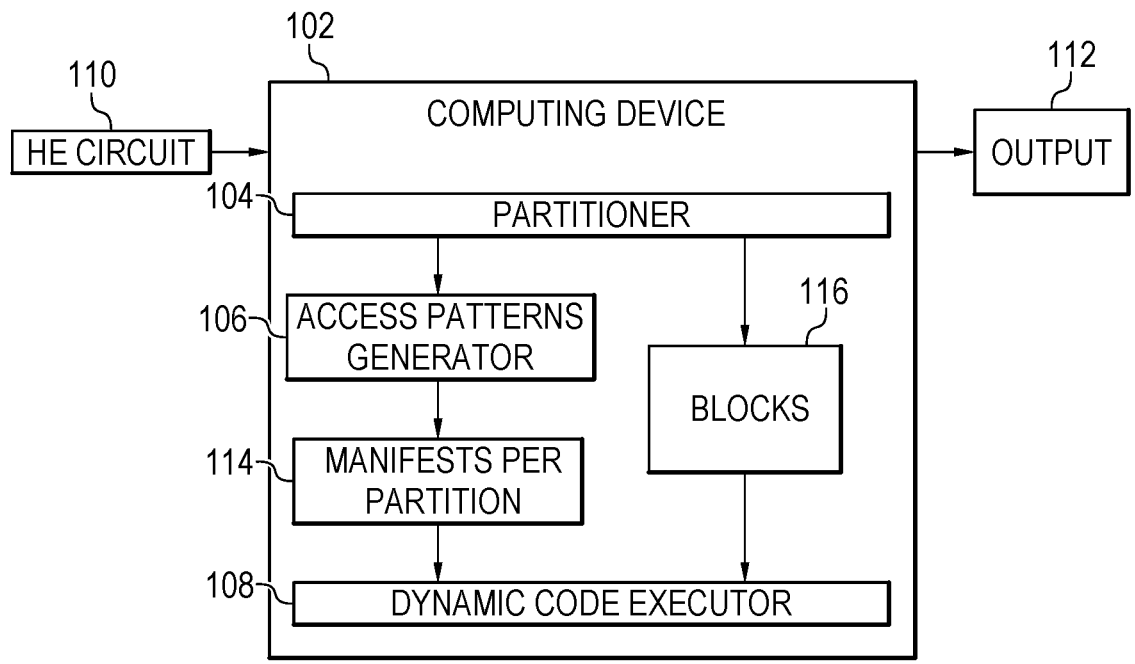
FIG. 1B is a block diagram of another example system for executing homomorphically encrypted (HE) code using dynamically selected blocks.

With reference now to FIG. 1B, a block diagram shows another example system 100B for executing homomorphically encrypted (HE) code using dynamically selected blocks. The example system 100B of FIG. 1B includes similarly referenced elements of FIG. 1A. In addition, the system 100B includes a set of manifests per partition 114 shown being generated by the access patterns generator 106, which is communicatively coupled to both the partitioner 104 and the dynamic code executer 108. The system 100B further includes a set of blocks 116 shown being generated by the partitioner 106, which is also communicatively coupled to the dynamic code executer 110. In various examples, a manifest 114 may be generated describing each access pattern generated for each combination of different block sizes and machine environments as described above in FIG. 1A. In addition, the partitioner 104 may provide a list of blocks 116 to the dynamic code executer.

It is to be understood that the block diagram of FIG. 1B is not intended to indicate that the system 100B is to include all of the components shown in FIG. 1B. Rather, the system 100B can include fewer or additional components not illustrated in FIG. 1B (e.g., additional computing devices, or additional HE circuits, outputs, etc.). For example, a circuit extractor (not shown) can extract the arithmetic circuit from the provided HE code using any suitable extraction technique.

Figure 2:
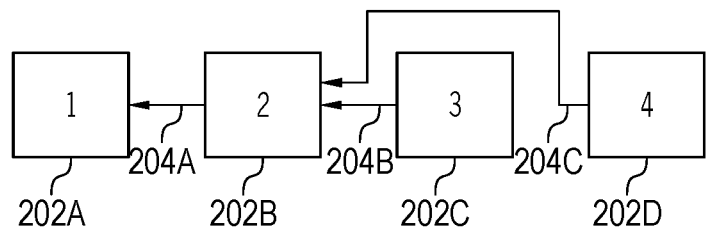
FIG. 2 is a block diagram of an example partitioned HE circuit for dynamic execution on a single device.

With reference now to FIG. 2, a block diagram shows an example partitioned HE circuit 200 for dynamic execution on a single device. The example circuit 200 includes a set of blocks 202A, 202B, 202C, and 202D. The circuit 200 further includes dependencies 204A, 204B, and 204C.

In the example of FIG. 2, an HE circuit is shown partitioned into blocks 202A, 202B, 202C, and 202D. For example, the HE circuit may have been partitioned using any of the partitioning techniques described herein, or any other suitable code partitioning technique. Based on the dependencies 204A-204C, a variety of partitions may be used to generate blocks, and access patterns may be calculated for each of the blocks. For example, the partitions may separate the circuit 200 into a first block including block 202A, a second block including block 202B and a third block including blocks 202C and 202D. As another example, the circuit 200 may be partitioned into blocks 202A, 202B, 202C, and 202D. In various examples, the size of the blocks may be determined using a tradeoff between an ability to plan ahead with larger blocks and an ability to quickly react to changes in the environment using smaller blocks.

In some examples, when the environment changes during execution, a dynamic HE code executor may wait until a current block has finished executing, and then run a subsequent block optimized to the new machine environment. For example, if blocks 202C and 202D are part of a currently executed block, then the system may wait until one or both are finished execution, and then determine whether block 202B should be executed according to a new plan in response to detecting the change in the machine environment. For example, the change may be a different number of servers available, a different amount of processing power available, a different amount of RAM available, or any combination thereof.

It is to be understood that the block diagram of FIG. 2 is not intended to indicate that the circuit 200 is to include all of the components shown in FIG. 2. Rather, the circuit 200 can include fewer or additional components not illustrated in FIG. 2 (e.g., additional blocks, hierarchies of blocks, or additional dependencies, etc.).

Figure 3:
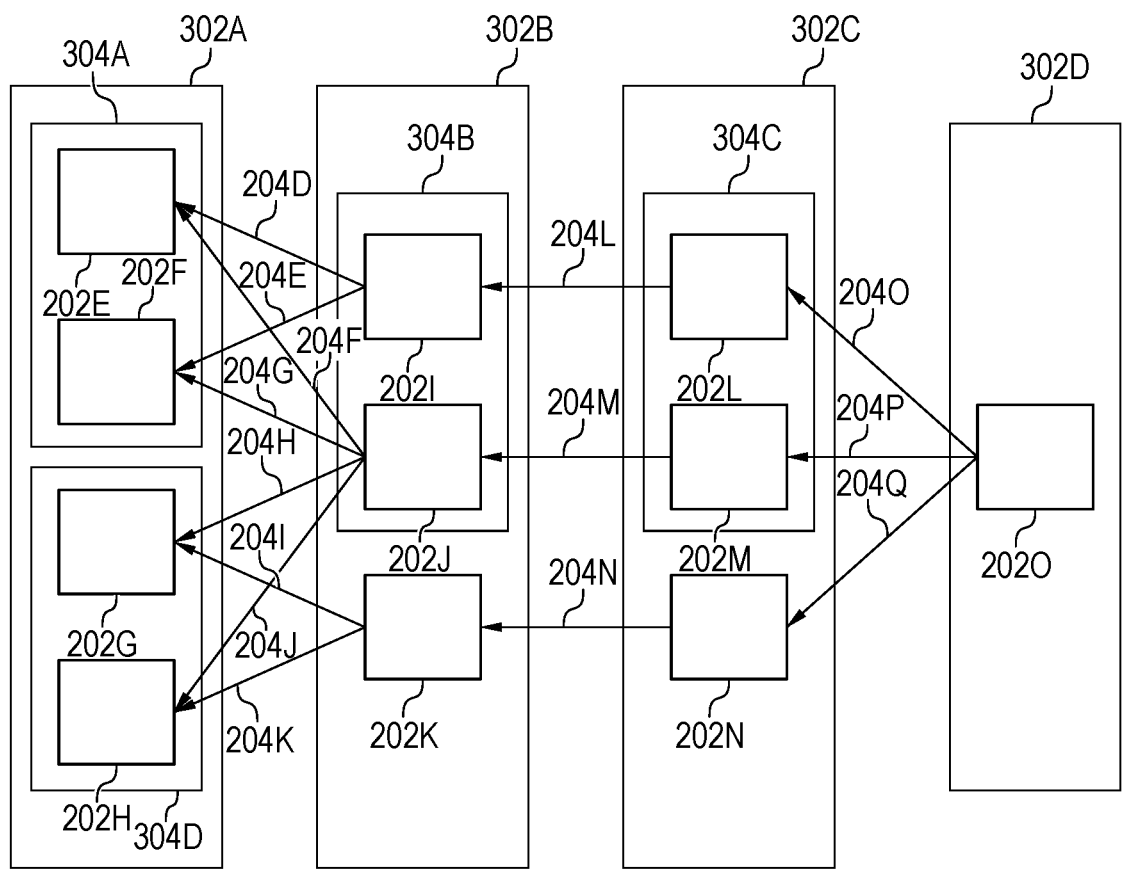
FIG. 3 is a block diagram of an example partitioned HE circuit for dynamic execution on multiple devices.

With reference now to FIG. 3, a block diagram shows an example partitioned HE circuit 300 for dynamic execution on multiple devices. The example circuit 300 includes a set of smallest blocks 202E-202O shown connected via dependencies 204D-204Q. The smallest blocks 202E-202O are organized into a highest set of hierarchical blocks 302A, 302B, 302C, and 302D. A subset of the smallest blocks 202E-202J, 202L, and 202M, are further organized into a next highest hierarchical level of blocks 304A, 304B, 304C, and 304D. In particular, block 304A includes smallest blocks 202E and 202F, block 304B includes smallest blocks 202I and 202J, block 304C includes smallest blocks 202L and 202M, and block 304D includes smallest blocks 202G and 202H.

In various examples, an HE code may be represented by the circuit 300. As one example, during execution, a dynamic code executor (not shown) may allocate any number of blocks in the circuit 300 at any hierarchy between two available servers. For example, in response to detecting the availability of two servers in a machine environment, then the dynamic code executor can apportion the various blocks in the circuit 300 between the two servers based on a plan generated for the circuit 300 in advance for a server availability of two servers. As one specific example, an optimal access pattern for such machine environment may have been determined such that blocks 304A, 304B, and 304C are assigned to be executed by a first server and blocks 304D, 202K, 202N, and 202O are to be assigned to the second server for execution. However, during the execution of these blocks by the two servers, the number of servers may change. For example, a third server may now be available for execution of blocks in parallel with the other two servers. Thus, as one example, one or more of the blocks 304A, 304B, 304C, and 304D may be broken up into their respective smallest blocks and the smallest blocks reapportioned between the three servers. In some examples, the execution of a smallest block in one or more of the blocks 304A, 304B, 304C, and 304D may be first completed, then the execution plan may be updated to reapportion one or more of the smallest blocks to the new third server for execution. Similarly, if the third server is no longer available, or the second server is not available, then the dynamic block executor can reapportion the small blocks using the higher level blocks 304A, 304B, 304C, and 304D or higher level blocks 302A, 302B, 302C, 302D in the case of a single server only being available.

It is to be understood that the block diagram of FIG. 3 is not intended to indicate that the circuit 300 is to include all of the components shown in FIG. 3. Rather, the circuit 300 can include fewer or additional components not illustrated in FIG. 3 (e.g., additional blocks, hierarchies, or additional dependencies, etc.).

Figure 4:
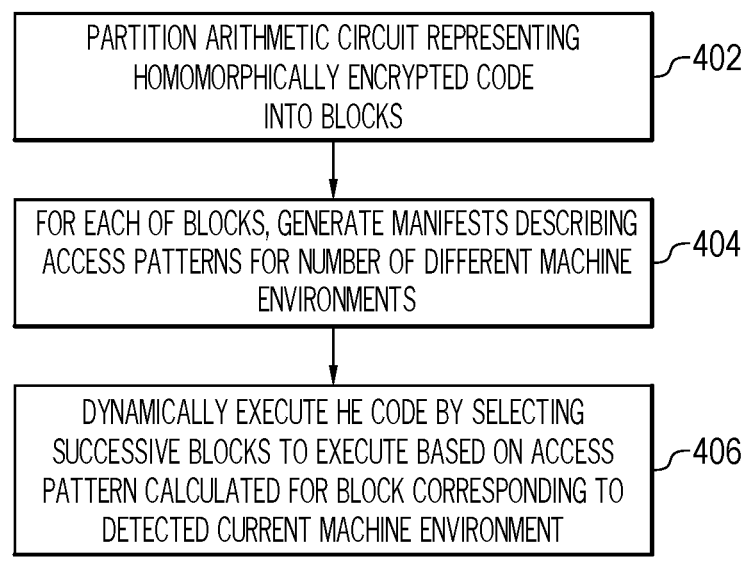
FIG. 4 is a process flow diagram of an example method that can dynamically execute homomorphically encrypted code.
Figure 5:
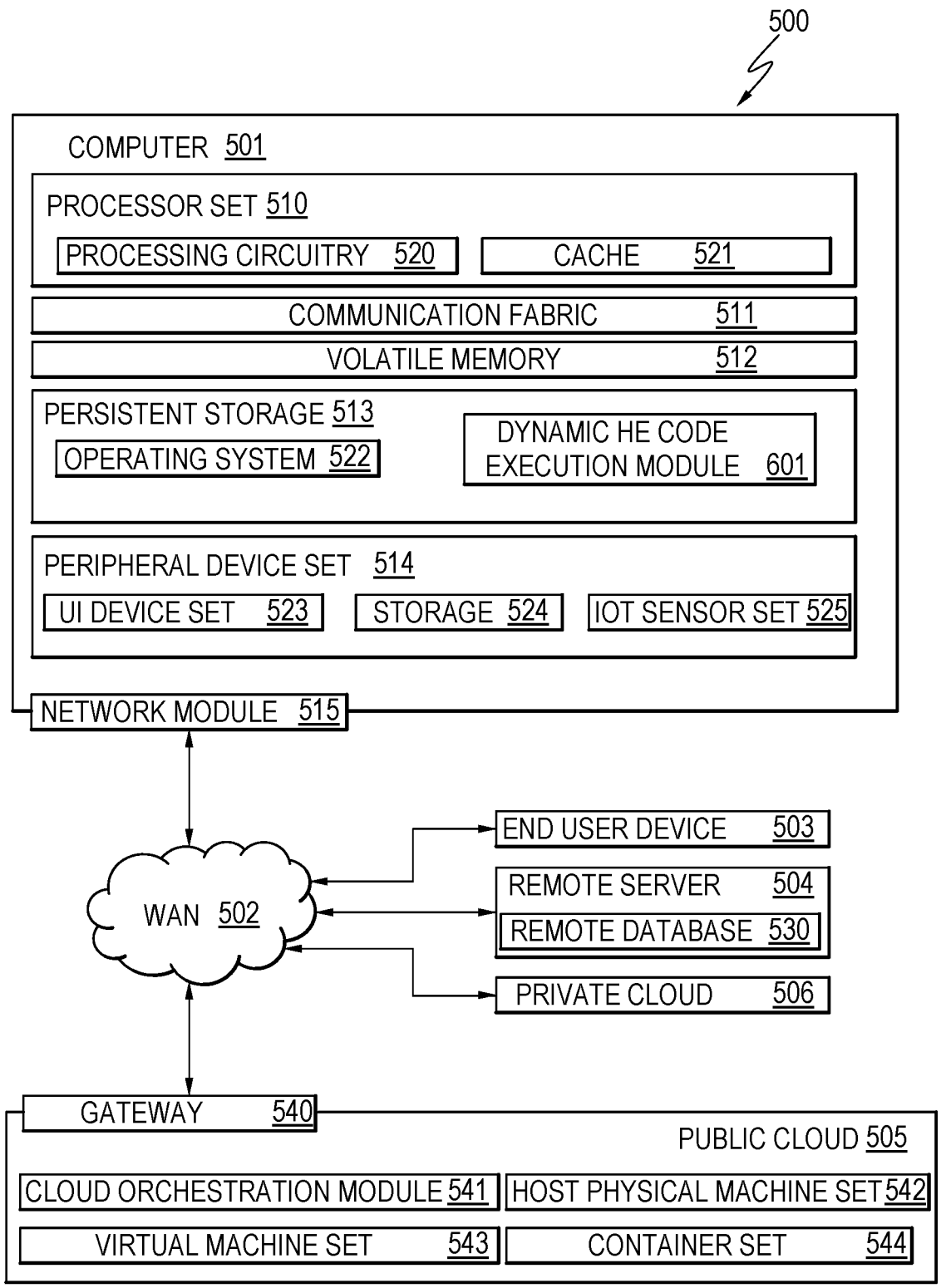
FIG. 5 is a block diagram of an example computing environment that contains an example of an environment for the execution of at least some of the computer code involved in performing the inventive methods, such as dynamic execution of homomorphically encrypted code.

FIG. 4 is a process flow diagram of an example method that can dynamically execute homomorphically encrypted code. The method 400 can be implemented with any suitable computing device, such as the computing device 102 of FIG. 1A and FIGS. 1B and 1s described with reference to the systems 100A, 100B of FIG. 1A and FIG. 1B, respectively. For example, the methods described below can be implemented by the processor set 510 or the processor 602 of FIGS. 5 and 6, respectively.

At block 402, a processor partitions an arithmetic circuit representing homomorphically encrypted (HE) code into blocks. In some examples, the processor can partition the arithmetic circuit according to functionality. For example, for a neural network that has different layers, the processor can partition the HE circuit to the different layers of the neural network. In another example, the processor may be computing some iterative algorithm and can divide every iteration into a block. In some examples, the processor can partition the arithmetic circuit according to a serialization of circuits. For example, the processor can execute the gates of the circuit in some order and each gate is given an index of execution which is its location in the execution series. The processor can then partition the gates into blocks where each block contains an initial gate and the gates with successive indices. In various examples, the processor can partition the arithmetic circuit according to fan-in and fan-out parameters. For example, the processor can partition the nodes into blocks as to minimize the edges coming from a node in one block and going to a node in another block. In this example, the processor may indicate a boundary of a block at a node with a small fan-in or fan-out, thus making its neighbors outside the block. As one example, if a node of an arithmetic circuit has many fan-in inputs but only one fan-out output=, then it may be easier to break up this portion of the circuit after such node. In some examples, the processor can partition the arithmetic circuit according to arithmetic computation of an evaluated polynomial that is split. For example, the polynomial may be split into sub-polynomials, which may then be executed in parallel by different machines. As one specific example, given the polynomial "2x*x+y*x−y*y", a circuit may be built from the expression "(x+y)*(2x−y)" with a separation point. Thus, the processor can separately compute (x+y) and (2x−y). In some examples, the processor can recursively partition an arithmetic circuit representing a homomorphically encrypted (HE) code into a number of blocks at any number of partitioning hierarchies.

At block 404, the processor generates a number of manifests describing access patterns for each of the blocks for a number of different machine environments. For example, one example machine environment may be a machine with 2, 4, 8, 16, 32, or 64 CPUs. As another example, a machine environment may include a machine with 8, 16, or 32 GB of RAM. In a third example, an example machine environment may include a machine that is already loaded with many processes compared to an empty machine that is running fewer processes.

At block 406, the processor executes the HE code by dynamically selecting successive blocks to execute based on an access pattern calculated for the block corresponding to a detected current machine environment. For example, smaller size successive blocks may be executed in response to detecting additional available servers. In some examples, larger size successive blocks at a higher level of a hierarchy may be executed in response to detecting a smaller number of available servers.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. In some examples, the method 400 may include generating the HE circuit from received HE code. For example, the method 400 can include executing the HE code and recording the operations caused by executing the HE code and recording the operations to build the HE circuit.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as dynamic HE code execution module 601. In addition to block 601, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 601, as identified above), peripheral device set 514 (including user interface (UI), device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 601 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 601 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

Figure 6:
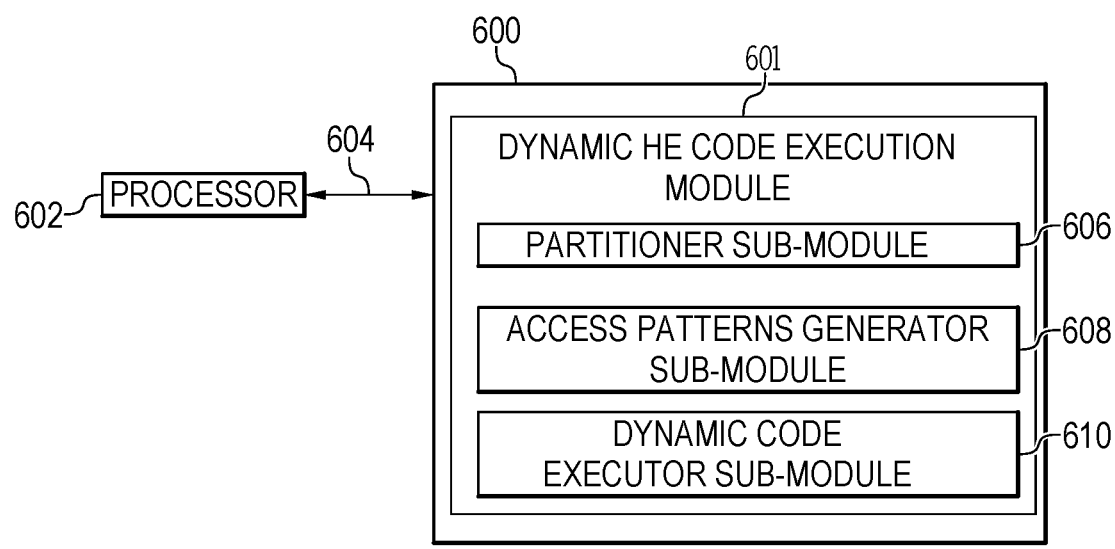
FIG. 6 is an example tangible, non-transitory computer-readable medium that can dynamically execute homomorphically encrypted code.

Referring now to FIG. 6, a block diagram is depicted of an example tangible, non-transitory computer-readable medium 600 that can dynamically execute homomorphically encrypted code. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 400 of FIG. 4.

The various software components discussed herein may be stored on the tangible, non-transitory, computer-readable medium 600, as indicated in FIG. 6. The -readable medium 600 include a dynamic HE code execution module 601 including a number of sub-modules. For example, a partitioner sub-module 606 includes code to partition an arithmetic circuit representing homomorphically encrypted (HE) code into blocks. The partitioner sub-module module 606 also includes code to identify interconnected blocks and replace the identified interconnected blocks with a directed acyclic graph. In some examples, the partitioner sub-module module 606 includes code to partition the HE circuit according to functionality. In some examples, the partitioner sub-module module 606 includes code to partition the HE circuit according to serialization of the circuits. In some examples, the partitioner sub-module module 606 includes code to partition the HE circuit according to an arithmetic computation of an evaluated polynomial that is split. In some examples, the partitioner sub-module module 606 includes code to partition the HE circuit according to fan-in and fan-out parameters. An access patterns generator module 608 includes code to generate manifests describing access patterns for each of the blocks for a number of different machine environments. For example, the different machine environments may include different numbers of systems, or different amounts of CPU resources, RAM resources, etc. A dynamic code executor sub-module 610 includes code to dynamically execute the HE code by selecting successive blocks to execute based on access pattern calculated for the block corresponding to a detected current machine environment. The dynamic code executor sub-module 610 also includes code to select a successive block based on a number of available systems for execution of the HE code. In some examples, the dynamic code executor sub-module 610 also includes code to monitor available platforms and allocate and prefetch sub-circuits corresponding to blocks into an available platform to increase a memory access speed of memory by prefetching data from a disk. In various examples, the dynamic code executor sub-module 610 also includes code to in response to detecting a change in a resource of the environment, finish execution of a smallest block and re-evaluating a remaining number of internal blocks at a same level of a partitioning hierarchy and evaluating external blocks at higher levels of the partitioning hierarchy.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
partition an arithmetic circuit representing a homomorphically encrypted (HE) code into a plurality of blocks;
generate, for each of the plurality of blocks, a plurality of manifests describing access patterns for a plurality of different machine environments; and
dynamically execute the HE code by selecting a successive block to execute based on an access pattern calculated for the block corresponding to a detected current machine environment.

2. The system of claim 1, wherein the processor is to recursively partition an arithmetic circuit representing a homomorphically encrypted (HE) code into the plurality of blocks at a plurality of partitioning hierarchies.

3. The system of claim 1, wherein the detected current environment comprises a detected amount of available memory.

4. The system of claim 1, wherein the successive block is selected using a scheduler that comprises a service that monitors a state of a system executing the HE code.

5. The system of claim 1, wherein the successive block is selected using a scheduler that comprises a stand-alone process per HE circuit.

6. The system of claim 1, wherein the processor is to select the successive block based on a number of systems available to execute the HE code.

7. The system of claim 6, wherein the processor is to select a successive block based on a largest block size for the detected current machine environment.

8. The system of claim 1, wherein the processor is to select a successive block based on a stability of a monitored system.

9. The system of claim 1, wherein, in response to detecting a change in a resource of the environment, the processor is to finish execution of a smallest block and re-evaluate a remaining number of internal blocks at a same level of a partition and evaluate external blocks at higher levels.

10. A computer-implemented method, comprising:
partitioning, via a processor, an arithmetic circuit representing homomorphically encrypted (HE) code into blocks;
generating, via the processor, manifests describing access patterns for each of the blocks for a plurality of different machine environments; and
dynamically executing, via the processor, the HE code by selecting successive blocks to execute based on an access pattern calculated for the block corresponding to a detected current machine environment.

11. The computer-implemented method of claim 10, wherein partitioning the arithmetic circuit comprises identifying interconnected blocks and replacing the identified interconnected blocks with a directed acyclic graph.

12. The computer-implemented method of claim 10, wherein partitioning the arithmetic circuit comprises partitioning according to functionality.

13. The computer-implemented method of claim 10, wherein partitioning the arithmetic circuit comprises partitioning according to serialization of circuits.

14. The computer-implemented method of claim 10, wherein partitioning the arithmetic circuit comprises partitioning according to fan-in and fan-out parameters.

15. The computer-implemented method of claim 10, wherein partitioning the arithmetic circuit comprises partitioning according to an arithmetic computation of an evaluated polynomial that is split.

16. The computer-implemented method of claim 10, wherein selecting successive blocks to execute is based on a detected number of available systems.

17. The computer-implemented method of claim 10, further comprising, in response to detecting a change in a resource of the environment, finishing execution, via the processor, of a smallest block and re-evaluating a remaining number of internal blocks at a same level of a partitioning hierarchy and evaluating external blocks at higher levels of the partitioning hierarchy.

18. A computer program product for execution of homomorphically encrypted code, the computer program product comprising a computer-readable storage medium having program code embodied therewith, the program code executable by a processor to cause the processor to:

partition an arithmetic circuit representing homomorphically encrypted (HE) code into blocks;

generate manifests describing access patterns for each of the blocks for a plurality of different machine environments; and dynamically execute the HE code by selecting successive blocks to execute based on access pattern calculated for the block corresponding to a detected current machine environment.

19. The computer program product of claim 18, further comprising program code executable by the processor to select a successive block based on a number of available systems for execution of the HE code.

20. The computer program product of claim 18, further comprising program code executable by the processor to monitor available platforms and allocate and prefetch sub-circuits corresponding to blocks into an available platform to increase a memory access speed of memory by prefetching data from a disk.

* * * * *